United States Patent
Oh et al.

(10) Patent No.: US 10,379,669 B2
(45) Date of Patent: Aug. 13, 2019

(54) APPARATUS FOR TOUCH SCREEN AND ELECTRONIC DEVICE COMPRISING THE SAME

(71) Applicant: LG Display Co., Ltd., Seoul (KR)

(72) Inventors: JunSeok Oh, Seoul (KR); JongHee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 56 days.

(21) Appl. No.: 15/264,443

(22) Filed: Sep. 13, 2016

(65) Prior Publication Data

US 2017/0315669 A1    Nov. 2, 2017

(30) Foreign Application Priority Data

Apr. 29, 2016    (KR) .................. 10-2016-0053024

(51) Int. Cl.
*G06F 3/041* (2006.01)
*G06F 3/044* (2006.01)
*G06F 3/045* (2006.01)

(52) U.S. Cl.
CPC ............ *G06F 3/0418* (2013.01); *G06F 3/044* (2013.01); *G06F 3/045* (2013.01); *G06F 3/0412* (2013.01); *G06F 3/0414* (2013.01); *G06F 3/0416* (2013.01); *G06F 2203/04101* (2013.01); *G06F 2203/04102* (2013.01); *G06F 2203/04105* (2013.01)

(58) Field of Classification Search
CPC .... G06F 3/0418; G06F 3/0412; G06F 3/0414; G06F 3/0416; G06F 3/041; G06F 3/044; G06F 3/045; G02F 1/13338

USPC ......................................................... 345/174
See application file for complete search history.

(56) References Cited

U.S. PATENT DOCUMENTS

| | | |
|---|---|---|
| 2009/0140996 A1 | 6/2009 | Takashima et al. |
| 2011/0234508 A1 | 9/2011 | Oda et al. |
| 2012/0068965 A1 | 3/2012 | Wada et al. |
| 2012/0218221 A1 | 8/2012 | Igeta |
| 2012/0306802 A1* | 12/2012 | McCracken .......... G06F 3/0416 345/174 |
| 2013/0342501 A1* | 12/2013 | Molne ................. G06F 3/0414 345/174 |
| 2014/0002390 A1* | 1/2014 | Lee ........................ G06F 3/041 345/173 |
| 2014/0085254 A1 | 3/2014 | Tenuta et al. |
| 2014/0218334 A1 | 8/2014 | Shibata et al. |
| 2014/0240621 A1* | 8/2014 | Klinghult ............ G02F 1/13338 349/12 |

(Continued)

FOREIGN PATENT DOCUMENTS

| | | |
|---|---|---|
| EP | 2990913 A1 | 3/2016 |
| JP | 2008-257494 A | 10/2008 |

(Continued)

*Primary Examiner* — William Boddie
*Assistant Examiner* — Fred Tzeng
(74) *Attorney, Agent, or Firm* — Birch, Stewart, Kolasch & Birch, LLP (57) ABSTRACT

Discussed is a touch screen apparatus according to an embodiment having a flat, curved or bending type display device, and an electronic device including the same. The touch screen apparatus includes a touch sensing circuit for outputting three-dimensional (3D) touch information by sensing a touch position through a first touch sensor and sensing a touch force through a second touch sensor.

20 Claims, 5 Drawing Sheets

(56) References Cited

U.S. PATENT DOCUMENTS

| | | | |
|---|---|---|---|
| 2014/0346029 A1 | 11/2014 | Sekizawa et al. | |
| 2015/0268802 A1 | 9/2015 | Kim et al. | |
| 2015/0301636 A1* | 10/2015 | Akimoto | G06F 3/044 345/173 |
| 2015/0370404 A1* | 12/2015 | Hu | G06F 3/044 345/174 |
| 2016/0062504 A1 | 3/2016 | Hwang et al. | |
| 2016/0282999 A1* | 9/2016 | Hwang | G06F 3/044 |

FOREIGN PATENT DOCUMENTS

| | | |
|---|---|---|
| JP | 2009-134473 A | 6/2009 |
| JP | 2009-163363 A | 7/2009 |
| JP | 2011-209785 A | 10/2011 |
| JP | 3173195 U | 1/2012 |
| JP | 2012-64108 A | 3/2012 |
| JP | 2012-178093 A | 9/2012 |
| JP | 2012-216205 A | 11/2012 |
| JP | 2013-168032 A | 8/2013 |
| JP | 3200386 U | 10/2015 |
| JP | 2016-51480 A | 4/2016 |
| WO | WO 2012/137442 A1 | 10/2012 |

\* cited by examiner

APPARATUS FOR TOUCH SCREEN AND ELECTRONIC DEVICE COMPRISING THE SAME

CROSS REFERENCE TO THE RELATED APPLICATIONS

This application claims the priority benefit of the Korean Patent Application No. 10-2016-0053024 filed on Apr. 29, 2016, which is hereby incorporated by reference as if fully set forth herein.

BACKGROUND

Field of the Invention

Embodiments of the present invention relate to an apparatus for touch screen (hereinafter, referred to as 'touch screen apparatus') and an electronic device comprising the same.

Discussion of the Related Art

A touch screen apparatus is a type of input apparatus that allows a user to input information through a screen contact of a display device without an additional input device in electronic devices. The touch screen apparatus is generally used as the input device for various kinds of products such as television, notebook computer and monitor as well as portable electronic devices such as electronic notebook, electronic book (e-book), PMP (Portable Multimedia Player), navigation, UMPC (Ultra Mobile PC), mobile phone, smart phone, smart watch, tablet PC (tablet Personal Computer), watch phone, and mobile communication terminal.

Recently, user interface environments, such as those included in applications which have been conceived use force touch and three-dimensional (3D) touch information. Subsequently, a touch screen apparatus capable of sensing a touch force and an electronic device comprising the same have been developed and studied.

A related art touch screen apparatus having a touch force function senses a touch position and a touch force by the use of change in capacitance, and calculates 3D touch information.

This touch force sensing method using the change of capacitance depends on the change of distance between touch electrodes. In order to precisely sense a touch force, it is necessary to maintain a vertical gap between the touch electrodes. Generally, the vertical gap between the touch electrodes is maintained by the use of gap maintenance member such as air layer or elastic member. However, it is difficult to secure reliability of the gap maintenance member due to repetitiveness and temperature. Accordingly, in case of a touch screen apparatus applied to a curved or bending type display device, it is difficult to maintain a gap between touch electrodes, which causes difficulty in sensing a precise touch force.

Also, in case of the related art touch screen apparatus having the touch force function, the touch electrode is shared by a touch sensor for sensing a touch position and a touch sensor for sensing a touch force. Thus, after each of the touch position and the touch force is sensed in a time division method (or sequential driving method), 3D touch information is calculated by the use of a touch algorithm calculation using the sensed data. Accordingly, the related art touch screen apparatus having the touch force function has difficulty in executing a touch report rate at high speed for time division driving. In this case, the touch report rate indicates a speed or frequency of transmitting coordinates information of the touch data sensed by the touch sensing to a host system.

SUMMARY

Accordingly, embodiments of the present invention are directed to a touch screen apparatus provided as a solution to one or more problems that occur in the related art, and an electronic device comprising the same.

An aspect of an embodiment of the present invention is directed to provide a touch screen apparatus which has a flat, curved or bending shaped display device, and an electronic device including the same.

Another aspect of an embodiment of the present invention is directed to provide a touch screen apparatus which is capable of executing a touch report rate at high speed during sensing a touch position and a touch force, and an electronic device comprising the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a touch screen apparatus that may include a touch sensing circuit for outputting 3D touch information by sensing a touch position through a first touch sensor and sensing a touch force through a second touch sensor.

In another aspect of an embodiment of the present invention, there is provided an electronic device that may include a display panel for displaying an image, and a touch screen apparatus, wherein the touch screen apparatus includes a touch sensing circuit for outputting 3D touch information by sensing a touch position through a first touch sensor and sensing a touch force through a second touch sensor.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows. The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, an apparatus for touch screen (hereinafter, referred to as 'touch screen apparatus') according to the preferred embodiments of the present invention and an electronic device comprising the same will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
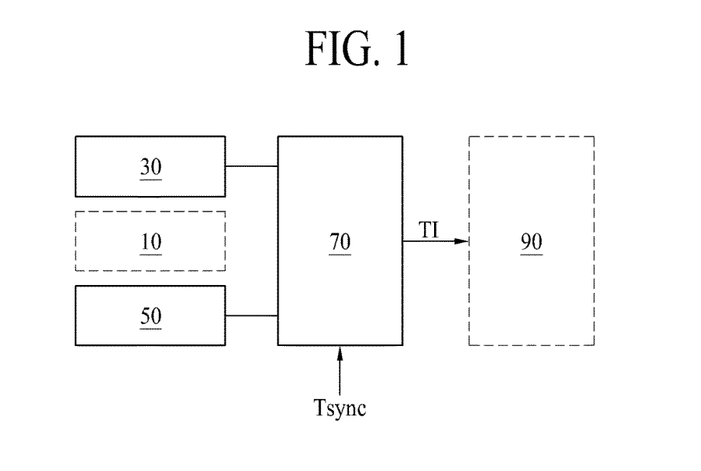
FIG. 1 is a block diagram illustrating a touch screen apparatus according to an embodiment of the present invention.

FIG. 1 is a block diagram illustrating a touch screen apparatus according to an embodiment of the present invention. Referring to FIG. 1, the touch screen apparatus according to an embodiment of the present invention may include a first touch panel 30, a second touch panel 50, and a touch sensing circuit 70.

The first touch panel 30 may be disposed on a display panel 10 for displaying an image, or may be attached to an upper surface of the display panel 10. The first touch panel 30 may include a plurality of first touch sensors, wherein a capacitance in each first touch sensor is changed by a user's touch.

Each of the plurality of first touch sensors is provided to sense a user's touch position for the first touch panel 30, wherein each first touch sensor may be a capacitance formed between a first touch sensing electrode and a plurality of first touch driving lines, for example, a mutual capacitance. The mutual capacitance in each of the plurality of first touch sensors may be changed based on the change of distance between the first touch driving line and a first touch sensing line in accordance with a user's touch, or may be changed whether or not a user's finger (or conductive object) touches the first touch panel 30. According to one embodiment of the present invention, each of the plurality of first touch driving lines and each of the plurality of first touch sensing lines may be an extended line pattern, or the plurality of first touch driving lines and the plurality of first touch sensing lines may be the plurality of electrode patterns being connected with each other through a bridge. In this instance, the first touch driving line and the first touch sensing line may be disposed alternately in an up-and-down direction, or may be disposed in the same plane while being adjacent to each other.

Alternatively, each of the plurality of first touch sensors may be a capacitance formed in each of the plurality of touch electrodes, for example, a self-capacitance. In this instance, the self-capacitance in each of the plurality of first touch sensors may be changed whether or not a user's finger (or conductive object) touches the first touch panel 30.

The second touch panel 50 may be disposed under the display panel 10, or may be disposed on the first touch panel 30. The second touch panel 50 may include a plurality of second touch sensors, wherein a resistance value in each second touch sensor is changed by a user's touch.

Each of the plurality of second touch sensors is provided to sense a user's touch force for the second touch panel 50, wherein each second touch sensor may be a resistance formed between a second touch sensing electrode and a plurality of second touch driving lines. The resistance value in the second touch sensor may be changed by a user's touch for the second touch panel 50, that is, a contact area between the second touch driving line and the second touch sensing electrode in accordance with a force touch (or contact load). The second touch panel 50 according to one embodiment of the present invention may include a plurality of second touch driving lines prepared in a first base substrate, a plurality of second touch sensing lines prepared in a second base substrate, an elastic resistor disposed between the first base substrate and the second base substrate, and a space for maintaining a gap between the first base substrate and the second base substrate.

Each of the plurality of second touch sensors is prepared in the elastic resistor disposed between the second touch driving line and the second touch sensing electrode being in perpendicular to each other. Also, each of the plurality of second touch sensors has a resistance value in accordance with the contact area between the second touch driving line and the second touch sensing electrode being in contact with the elastic resistor.

Accordingly, because the second touch panel 50 includes the second touch sensor whose resistance value is changed by a user's touch, the touch screen apparatus according to one embodiment of the present invention can easily maintain a vertical gap between the second touch driving line and the second touch sensing electrode, in comparison to a related art capacitive type touch force sensor. The touch screen apparatus according to one embodiment of the present invention is applicable to an electronic device having a curved or bending type display device as well as a flat type display device.

The touch sensing circuit 70 senses the touch position through the first touch sensor of the first touch panel 30 and senses the touch force through the second touch sensor of the second touch panel 50 on the basis of touch synchronization signal (Tsync), generates 3D touch information (TI) including touch position data and touch force data, and outputs the generated 3D touch information (TI) to an external host processing circuit 90. In this instance, the touch position data may be defined by digital information of each for the X-axis and Y-axis coordinates of the touch position, and the touch force data may be defined by digital information of force level or Z-axis coordinates for the touch position.

The touch synchronization signal (Tsync) may include first and second periods. In this instance, the first period may be a touch sensing period, and the second period may be a displaying period. The touch synchronization signal (Tsync) may be generated based on a frame synchronization signal of the display panel 10. In this instance, the touch synchronization signal (Tsync) may be provided from a display panel driver for driving the display panel 10, that is, a timing controller, or may be provided from the host processing circuit 90.

The touch sensing circuit 70 according to one embodiment of the present invention may sense the change of capacitance in the first touch sensor for the first period of the touch synchronization signal (Tsync), sense the change of resistance value in the second touch sensor for the second period of the touch synchronization signal (Tsync), generates the 3D touch information including the touch position data and the touch force data, and output the generated 3D touch information to the host processing circuit 90. For the second period of the touch synchronization signal (Tsync), the touch sensing circuit 70 according to one embodiment of the present invention may calculate the touch position data by sensing the change of resistance value in the second touch sensor and simultaneously executing a touch position calculation algorithm, and calculate the touch force data through the execution of touch force calculation algorithm, and then generate the 3D touch information (TI) based on the calculated touch position data and touch force data. Accordingly, the touch sensing circuit 70 according to one embodiment of the present invention enables to reduce the algorithm execution time of generating the 3D touch information (TI) by the decrease in execution time of the touch position calculation algorithm, and further to execute a touch report rate at high speed.

The touch sensing circuit 70 according to another embodiment of the present invention may sense the change of capacitance in the first touch sensor and the change of resistance value in the second touch sensor for the first period of the touch synchronization signal (Tsync), generates the 3D touch information including the touch position data and the touch force data for the second period of the touch synchronization signal (Tsync), and output the generated 3D touch information to the host processing circuit 90. In this instance, the first period of the touch synchronization signal (Tsync) may include at least one of first sensing period, and at least one of second sensing period which is different from the first sensing period. The touch sensing circuit 70 according to another embodiment of the present invention may sense the change of capacitance in the first touch sensor every first sensing period, and sense the change of resistance value in the second touch sensor every second sensing period. The touch sensing circuit 70 according to another embodiment of the present invention may sequentially or simultaneously calculate touch position data through the execution of touch position calculation algorithm and touch force data through the execution of touch force calculation algorithm for the first period of the touch synchronization signal (Tsync), and generate 3D touch information (TI) based on the calculated touch position data and touch force data. Accordingly, the touch sensing circuit 70 according to another embodiment of the present invention alternately executes touch position sensing and touch force sensing processes so that it is possible to minimize a signal interference noise between the touch driving of the first touch panel 30 and the touch driving of the second touch panel 50, and furthermore to improve sensitivity.

The host processing circuit 90 may be an application processor of an electronic device having a force touch function (or 3D touch function). The host processing circuit 90 receives the 3D touch information (TI) which is output from the touch sensing circuit 70, and executes a corresponding application based on the received 3D touch information (TI).

The touch screen apparatus according to one embodiment of the present invention senses the touch position in the capacitive type using the first touch panel 30, and senses the touch force in the resistive type using the second touch panel 50, whereby the touch screen apparatus according to one embodiment of the present invention is applicable to a curved or bending type display device as well as a flat type display device, and the touch screen apparatus according to one embodiment of the present invention is capable of executing the touch report rate at high speed during the touch position sensing and touch force sensing. Also, the touch screen apparatus according to one embodiment of the present invention alternately executes the touch position sensing and touch force sensing processes so that it is possible to minimize the signal interference noise between the touch driving of the first touch panel 30 and the touch driving of the second touch panel 50, and furthermore to improve sensitivity.

Figure 2:
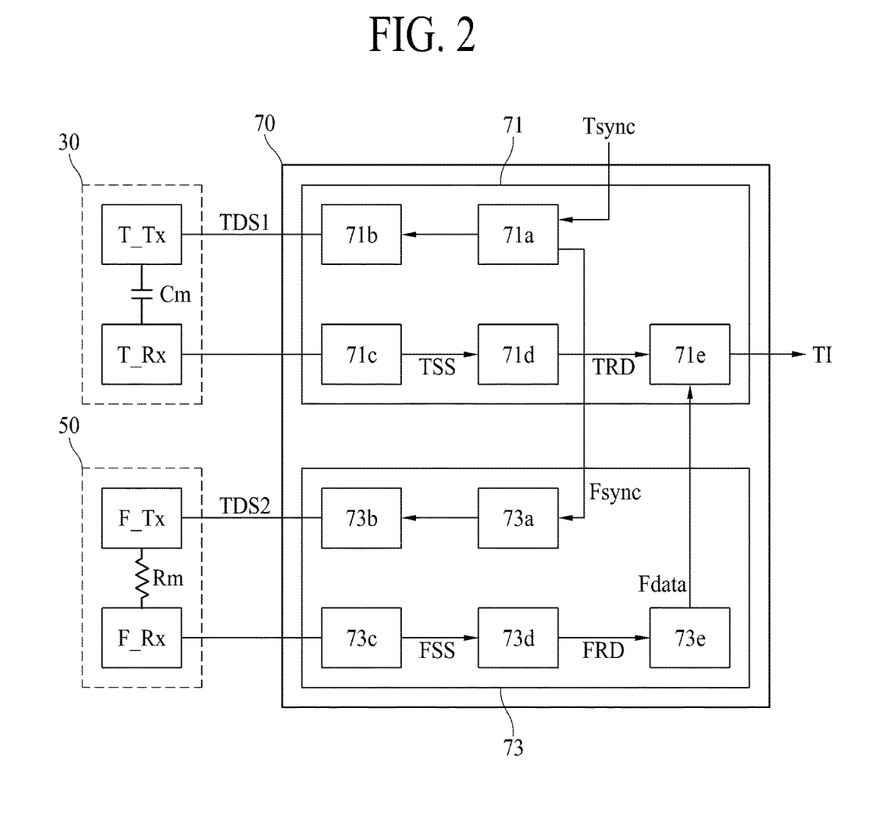
FIG. 2 is a block diagram illustrating a structure of a touch sensing circuit according to a first embodiment of the present invention in the touch screen apparatus of FIG. 1.

FIG. 2 is a block diagram illustrating the structure of the touch sensing circuit according to the first embodiment of the present invention in the touch screen apparatus of FIG. 1. Referring to FIG. 2, the touch sensing circuit 70 according to the embodiment of the present invention may include two integrated circuits of a first touch integrated circuit 71 and a second touch integrated circuit 73. In this instance, the first touch integrated circuit 71 may be a master circuit or a slave circuit for the host processing circuit 90. The second touch integrated circuit 73 may be a slave circuit for the first touch integrated circuit 71 and the host processing circuit 90.

The first touch integrated circuit 71 senses the touch position for a user's touch on the first touch panel 30 by driving the first touch panel 30 in accordance with a capacitive type touch driving method. That is, the first touch integrated circuit 71 generates touch raw data (TRD) by sensing the change of capacitance in the first touch sensor (Cm) prepared in the first touch panel 30, and calculates the touch position data based on the touch raw data (TRD). The first touch integrated circuit 71 according to one embodiment of the present invention may include a first touch control circuit 71a, a first electrode driving circuit 71b, a first sensing unit 71c, a first analog-to-digital converting circuit 71d, and a first touch processing circuit 71e.

The first touch control circuit 71a receives the touch synchronization signal (Tsync) supplied from the external timing controller or host processing circuit, and controls the driving timing of internal circuit for the first touch integrated circuit 71 on the basis of touch synchronization signal (Tsync). Especially, the first touch control circuit 71a generates a force synchronization signal (Fsync) for controlling an operation of the second touch integrated circuit 73 on the basis of touch synchronization signal (Tsync). In an embodiment of the present invention, the first touch control circuit 71a may be provided inside the first touch processing circuit 71e. In this instance, it is possible to omit the first touch control circuit 71a.

The first electrode driving circuit 71b may individually drive the first touch driving lines (T_Tx) prepared in the first touch panel 30, or may divide the plurality of first touch driving lines (T_Tx) into groups and drive the plurality of first touch driving lines (T_Tx) by each group. The first electrode driving circuit 71b may generate a first touch driving signal, and supply the first touch driving signal to a first touch driving line (T_Tx) corresponding to a channel control of the first touch control circuit 71a.

The first sensing unit 71c is connected with the first touch sensing line (T_Rx) of the first touch panel 30. The first sensing unit 71c generates an analog-type touch sensing signal (TSS) by amplifying electric charges of the first touch sensing line (T_Rx) in accordance with the change of capacitance (Cm) in the first touch sensor. The plurality of first sensing units 71c according to one embodiment of the present invention may be an integrating circuit including a comparator which compares the signal received from one of the first touch sensing line (T_Rx) with a reference voltage, and generates the touch sensing signal (TSS) based on the comparison result. The first sensing unit 71c according to another embodiment of the present invention may be an integrating circuit including a differential amplifier which amplifies the difference between the signals received from the adjacent two of the first touch sensing lines (T_Rx), and generates the touch sensing signal (TSS).

The first analog-to-digital converting circuit 71d converts the touch sensing signal (TSS) supplied from the first sensing unit 71c into digital type touch raw data (TRD), and outputs the generated touch raw data (TRD) of the digital type to the first touch processing circuit 71e.

The first touch processing circuit 71e calculates the touch position data based on the touch raw data (TRD) supplied from the first analog-to-digital converting circuit 71d. For example, the first touch processing circuit 71e may be MCU (Micro Controller Unit), wherein the first touch processing circuit 71e receives the touch raw data (TRD) which is output from the first analog-to-digital converting circuit 71d, temporarily stores the touch raw data (TRD) in the internal storing circuit, calculates the touch position data (Tdata) for the temporarily-stored touch raw data (TRD) through the execution of preset touch position calculation algorithm, and temporarily stores the touch position data in the internal storing circuit. In this instance, the touch position calculation algorithm may be any algorithm generally known to those in the art. For example, the touch position calculation algorithm may generate the touch position data by comparing the touch raw data (TRD) with a preset threshold value, granting an identification code for each of the touch raw data (TRD) obtained from the first touch sensors in the touch input position of the touch raw data (TRD) above the threshold value, and calculating the X-Y coordinates of each of the first touch sensors.

Also, the first touch processing circuit 71e receives the touch force data supplied from the second touch integrated circuit 73, generates the 3D touch information (TI) based on the received touch force data and the touch position data temporarily stored in the internal storing circuit, and outputs the generated 3D touch information (TI) to the host processing circuit 90.

The second touch integrated circuit 73 senses the touch force for a user's touch on the second touch panel 50 by driving the second touch panel 50 in accordance with a resistive type touch driving method. That is, the second touch integrated circuit 73 generates force raw data (FRD) by sensing the change of resistance value in the second touch sensor (Rm) prepared in the second touch panel 50, and calculates the touch force data (Fdata) based on the force raw data (FRD). The second touch integrated circuit 73 according to one embodiment of the present invention may include a second touch control circuit 73a, a second electrode driving circuit 73b, a second sensing unit 73c, a second analog-to-digital converting circuit 73d, and a second touch processing circuit 73e.

The second touch control circuit 73a receives the force synchronization signal (Fsync) supplied from the first touch integrated circuit 71, and controls the driving timing of internal circuit for the second touch integrated circuit 73 on the basis of force synchronization signal (Fsync). Alternatively, the second touch control circuit 73a may be provided inside the second touch processing circuit 73e. In this instance, it is possible to omit the second touch control circuit 73a.

The second electrode driving circuit 73b may individually drive the plurality of second touch driving lines (F_Tx) prepared in the second touch panel 50, or may divide the plurality of second touch driving lines (F_Tx) into groups and drive the plurality of second touch driving lines (F_Tx) by each group, wherein each group may include two or more second touch driving lines (F_Tx). The second electrode driving circuit 73b generates a second touch driving signal, and supplies the second touch driving signal to a second touch driving line (F_Tx) corresponding to a channel control of the second touch control circuit 73a. In this instance, the type of the second touch driving signal may be the same as or different from the type of the first touch driving signal. For example, the first touch driving signal may include a plurality of pulses, and the second touch driving signal may be a direct-current (DC) signal, alternating-signal (AC) signal, or ground.

The second sensing unit 73c is connected with the second touch sensing line (F_Rx) of the second touch panel 50. The second sensing unit 73c generates an analog-type force sensing signal (FSS) by amplifying a voltage of the second touch sensing line (F_Rx) in accordance with the change of resistance value in the second touch sensor (Rm). The plurality of second sensing units 73c according to one embodiment of the present invention may be a reverse amplifier which generates the force sensing signal (FSS) by amplifying the voltage in accordance with the change of resistance value in the second touch sensor (Rm) received from one of the second touch sensing line (F_Rx).

The second analog-to-digital converting circuit 73d converts the force sensing signal (FSS) supplied from the second sensing unit 73c into digital type force raw data (FRD), and outputs the generated force raw data (FRD) of the digital type to the second touch processing circuit 73e.

The second touch processing circuit 73e calculates the touch force data (Fdata) based on the force raw data (FRD) supplied from the second analog-to-digital converting circuit 73d, and provides the calculated touch force data (Fdata) to the first touch processing circuit 71e of the first touch integrated circuit 71.

For example, the second touch processing circuit 73e may be MCU (Micro Controller Unit), wherein the second touch processing circuit 73e receives the force raw data (FRD) which is output from the second analog-to-digital converting circuit 73d, temporarily stores the force raw data (FRD) in the internal storing circuit, calculates the touch force data (Fdata) for the temporarily-stored force raw data (FRD) through the execution of preset touch force calculation algorithm, and temporarily stores the touch force data in the internal storing circuit. In this instance, the touch force calculation algorithm may be any algorithm generally known to those in the art. For example, the touch force calculation algorithm may generate the touch force data by comparing the force raw data (FRD) with a preset threshold value, assigning an identification code for each of the force raw data (FRD) obtained from the second touch sensors in the touch input position of the force raw data (FRD) above the threshold value, and calculating the Z-axis coordinates or level of each of the second touch sensors.

Alternatively, the second touch processing circuit 73e may receive the touch position data (Tdata) supplied from the first touch integrated circuit 71, generate the 3D touch information (TI) based on the received touch position data (Tdata) and the touch force data (Fdata) temporarily stored in the internal storing circuit, and output the generated 3D touch information (TI) to the host processing circuit 90.

Figure 3:
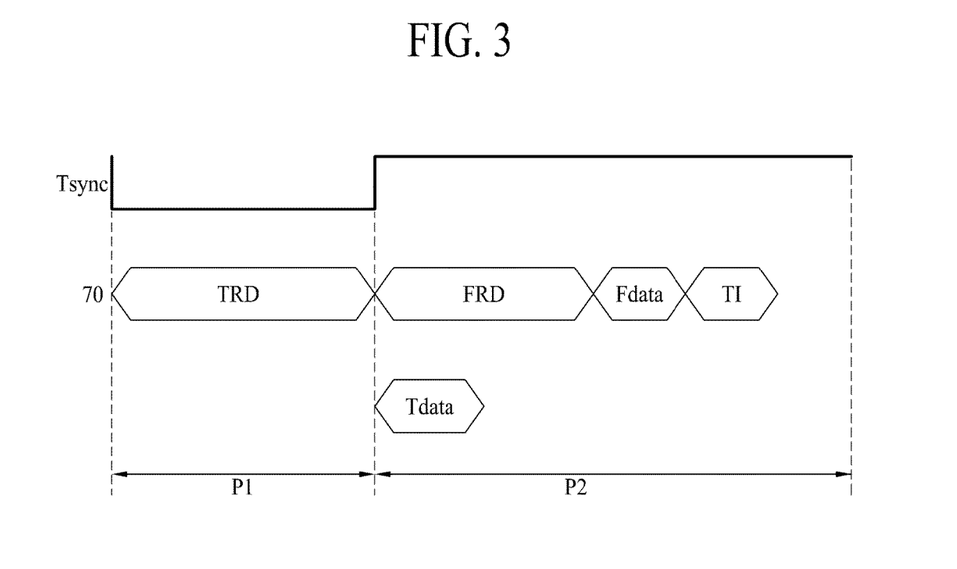
FIG. 3 illustrates a first operation sequence in the touch sensing circuit of FIG. 2 according to the first embodiment of the present invention.

FIG. 3 illustrates a first operation sequence in the touch sensing circuit of FIG. 2 according to the first embodiment of the present invention. Referring to FIGS. 2 and 3, the touch sensing circuit 70 according to the first embodiment of the present invention executes the touch position sensing in the first period (P1) of the touch synchronization signal (Tsync), and executes the touch force sensing and the touch position calculation algorithm in the second period (P2) of the touch synchronization signal (Tsync) in parallel. This will be described in detail as follows.

First, during the first period (P1) of the touch synchronization signal (Tsync), the touch sensing circuit 70 according to the first embodiment of the present invention generates the touch raw data (TRD) by sensing the change of capacitance in the first touch sensor of the first touch panel 30 in accordance with the driving of the first touch integrated circuit 71.

Then, during the second period (P2) of the touch synchronization signal (Tsync), the touch sensing circuit 70 according to the embodiment of the present invention generates the force raw data (FRD) by sensing the change of resistance value in the second touch sensor of the second touch panel 50 in accordance with the driving of the second touch integrated circuit 73 and calculates touch force data (Fdata) based on the force raw data (FRD), and simultaneously generates the touch position data (Tdata) based on the touch raw data (TRD) through the execution of the touch position calculation algorithm. Thereafter, the touch sensing circuit 70 according to the embodiment of the present invention generates the 3D touch information (TI) based on the touch position data (Tdata) and the touch force data (Fdata) in accordance with the driving of the first touch integrated circuit 71, and outputs the generated 3D touch information (TI) to the host processing circuit 90.

Accordingly, the touch sensing circuit 70 according to the embodiment of the present invention executes the touch force sensing and the touch position calculation algorithm in parallel, so that it is possible to execute the touch report rate at high speed, and also to improve sensitivity by minimizing a signal interference noise between the touch position sensing and the touch force sensing.

Figure 4:
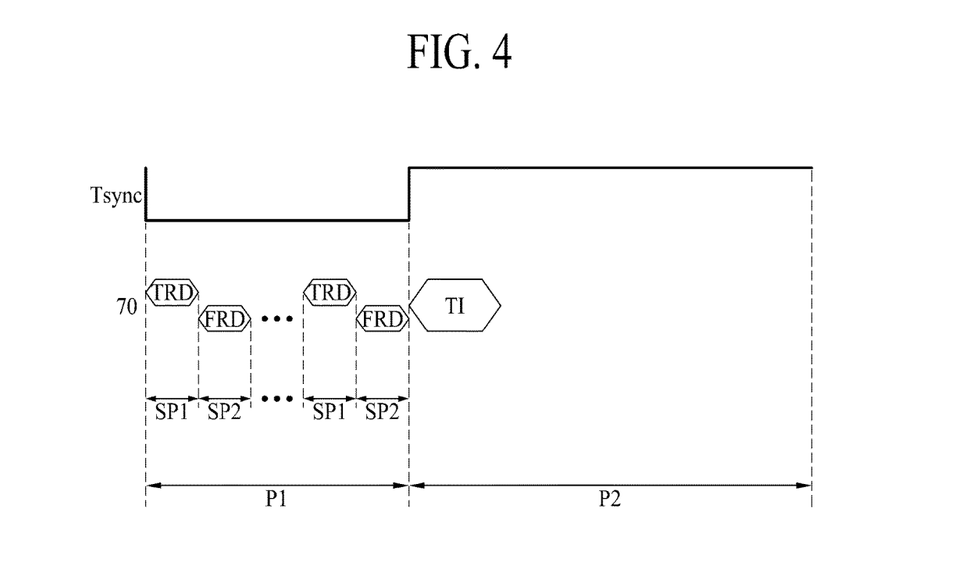
FIG. 4 illustrates a second operation sequence in the touch sensing circuit of FIG. 2 according to the first embodiment of the present invention.

FIG. 4 illustrates a second operation sequence in the touch sensing circuit of FIG. 2 according to the first embodiment of the present invention. Referring to FIGS. 2 and 4, the touch sensing circuit 70 according to the embodiment of the present invention alternately executes the touch position sensing and the touch force sensing in the first period (P1) of the touch synchronization signal (Tsync), and sequentially or simultaneously executes the touch position calculation algorithm and the force level calculation algorithm in the second period (P2) of the touch synchronization signal (Tsync). This will be described in detail as follows.

First, the first period (P1) of the touch synchronization signal (Tsync) may include a plurality of first sensing periods (SP1), and a plurality of second sensing periods (SP2), wherein each of the plurality of second sensing periods (SP2) is set between each of the plurality of first sensing periods (SP1). In this instance, each of the plurality of second sensing periods (SP2) may be a blank period between each of the adjacent first sensing periods (SP1).

For the first period (P1) of the touch synchronization signal (Tsync), the touch sensing circuit 70 according to the embodiment of the present invention generates the touch raw data (TRD) by sensing the change of capacitance in the first touch sensor of the first touch panel 30 in accordance with the first touch integrated circuit 71 driven every first sensing period (SP1), and generates the force raw data (FRD) by sensing the change of resistance value in the second touch sensor of the second touch panel 50 in accordance with the second touch integrated circuit 73 driven every second sensing period (SP2). In this instance, the first touch integrated circuit 71 executes the touch position sensing for all the first touch sensing lines (T_Rx) prepared in the first touch panel 30 for the first period (P1) of the touch synchronization signal (Tsync). However, the first touch integrated circuit 71 may execute the touch position sensing for at least one of the first touch sensing line (T_Rx) every first sensing period (SP1). In the same manner, the second touch integrated circuit 73 executes the touch force sensing for all the second touch sensing lines (F_Rx) prepared in the second touch panel 50 for the first period (P1) of the touch synchronization signal (Tsync). However, the second touch integrated circuit 73 may execute the touch force sensing for at least one of the second touch sensing line (F_Rx) every second sensing period (SP2).

For the second period (P2) of the touch synchronization signal (Tsync), the touch sensing circuit 70 according to the first embodiment of the present invention simultaneously or sequentially calculates the touch position data (Tdata) based on the touch raw data (TRD) through the execution of the touch position calculation algorithm in accordance with the driving of the first touch integrated circuit 71, and the touch force data (Fdata) based on the force raw data (FRD) through the execution of the touch force calculation algorithm, generates the 3D touch information (TI) based on the touch position data (Tdata) and the touch force data (Fdata), and outputs the generated 3D touch information (TI) to the host processing circuit 90.

Accordingly, the touch sensing circuit 70 according to the first embodiment of the present invention executes the touch force sensing during the blank period of the touch position sensing so that it is possible to execute the touch report rate at high speed, and to improve sensitivity by minimizing the signal interference noise between the touch position sensing and the touch force sensing.

Figure 5:
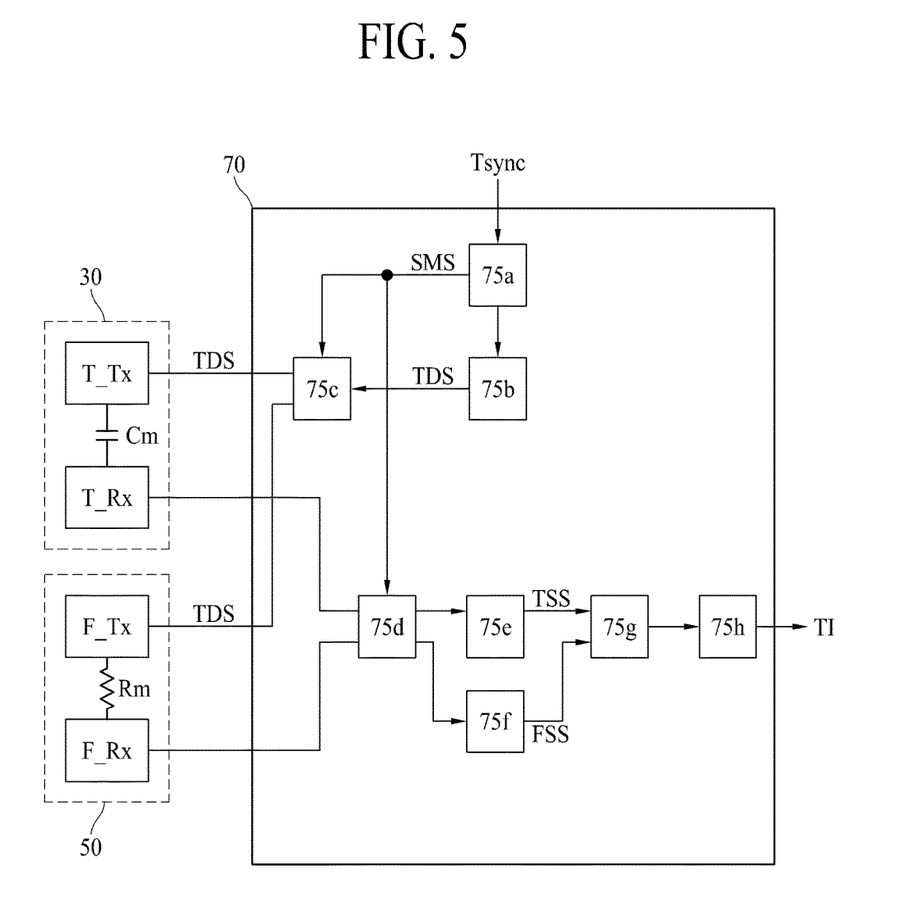
FIG. 5 is a block diagram illustrating a structure of a touch sensing circuit according to a second embodiment of the present invention in the touch screen apparatus of FIG. 1.

FIG. 5 is a block diagram illustrating a structure of a touch sensing circuit according to the second embodiment of the present invention in the touch screen apparatus of FIG. 1.

Referring to FIG. 5, the touch sensing circuit 70 according to the second embodiment of the present invention is configured to include one integrated circuit connected with the first and second touch panels 30 and 50 in common. For example, the touch sensing circuit 70 according to the second embodiment of the present invention may include a touch control circuit 75a, an electrode driving circuit 75b, a first selecting unit 75c, a second selecting unit 75d, a first sensing unit 75e, a second sensing unit 75f, an analog-to-digital converting circuit 75g, and a touch processing circuit 75h.

The touch control circuit 75a receives the touch synchronization signal (Tsync) supplied from the external timing controller or host processing circuit, and controls the driving timing of internal circuit for the touch sensing circuit 70 on the basis of touch synchronization signal (Tsync).

For example, the touch control circuit 75a generates a sensing mode signal (SMS) corresponding to a preset operation sequence of the touch sensing circuit 70 on the basis of the touch synchronization signal (Tsync). In this instance, the sensing mode signal (SMS) may have a first logic state for the touch position sensing, and a second logic state for the touch force sensing. Alternatively, the touch control circuit 75a may be provided inside the touch processing circuit 75h. In this instance, it is possible to omit the touch control circuit 75a.

In response to the control of the touch control circuit 75a, the electrode driving circuit 75b generates a touch driving signal (TDS) for the touch sensing driving of each of the first touch panel 30 and the second touch panel 50. For example, the touch driving signal (TDS) may include a plurality of pulses.

The first selecting unit 75c supplies the touch driving signal (TDS), which is supplied from the electrode driving circuit 75b, to the first touch driving line (T_Tx) of the first touch panel 30 or the second touch driving line (F_ Tx) of the second touch panel 50 on the basis of channel selection signal and sensing mode signal (SMS) provided from the touch control circuit 75a. For example, the first selecting unit 75c may supply the touch driving signal (TDS) to at least one of the first touch driving line (T_Tx) in response to the sensing mode signal (SMS) of the first logic state. In accordance with the channel selection signal, the first selecting unit 75c may sequentially supply the touch driving signal (TDS) to the plurality of first touch driving lines (T_Tx), or may supply the touch driving signal (TDS) to at least two of the first touch driving lines (T_Tx) at the same time. In response to the sensing mode signal (SMS) of the second logic state, the first selecting unit 75c may supply the touch driving signal (TDS) to at least one of the second touch driving line (F_Tx). In accordance with the channel selection signal, the first selecting unit 75c may sequentially supply the touch driving signal (TDS) to the plurality of second touch driving lines (F_Tx), or may supply the touch driving signal (TDS) to at least two of the second touch driving lines (F_Tx) at the same time.

On the basis of channel selection signal and sensing mode signal (SMS) provided from the touch control circuit 75a, the second selecting unit 75d may connect the first touch sensing line (T_Rx) prepared in the first touch panel 30 with the first sensing unit 75e, or may connect the second touch sensing line (F_Rx) prepared in the second touch panel 50 with the second sensing unit 75f. For example, in response to the sensing mode signal (SMS) of the first logic state, the second selecting unit 75d may sequentially connect the plurality of first touch sensing lines (T_Rx) with the first sensing unit 75e, or may connect the two of the first touch sensing lines (T_Rx) corresponding to the channel selection signal with the first sensing unit 75e. In response to the sensing mode signal (SMS) of the second logic state, the second selecting unit 75d may sequentially connect the plurality of second touch sensing lines (F_Rx) with the second sensing unit 75f, or may connect the two of the second touch sensing lines (F_Rx) corresponding to the channel selection signal with the second sensing unit 75f.

The first sensing unit 75e is connected with the first touch sensing line (T_Rx) of the first touch panel 30 through the second selecting unit 75d. The first sensing unit 75e generates an analog-type touch sensing signal (TSS) by amplifying electric charges of the first touch sensing line (T_Rx) in accordance with the change of capacitance in the first touch sensor (Cm). The plurality of first sensing units 75e according to one embodiment of the present invention may be an integrating circuit including a comparator which compares the signal received from one of the first touch sensing line (T_Rx) with a reference voltage, and generates the touch sensing signal (TSS) based on the comparison result. The first sensing unit 75e according to another embodiment of the present invention may be an integrating circuit including a differential amplifier which amplifies the difference between the signals received from the adjacent two of the first touch sensing lines (T_Rx), and generates the touch sensing signal (TSS).

The second sensing unit 75f is connected with the second touch sensing line (F_Rx) of the second touch panel 50 through the second selecting unit 75d. The second sensing unit 75f generates an analog-type force sensing signal (FSS) by amplifying a voltage of the second touch sensing line (F_Rx) in accordance with the change of resistance value in the second touch sensor (Rm). The plurality of second sensing units 75f according to one embodiment of the present invention may be a reverse amplifier which generates the force sensing signal (FSS) by amplifying the voltage in accordance with the change of resistance value in the second touch sensor (Rm) received from one of the second touch sensing line (F_Rx).

The analog-to-digital converting circuit 75g converts the touch sensing signal (TSS) supplied from the first sensing unit 75e into digital type touch raw data (TRD), and outputs the generated touch raw data (TRD) of the digital type to the touch processing circuit 75h. Also, the analog-to-digital converting circuit 75g converts the force sensing signal (FSS) supplied from the second sensing unit 75f to digital type force raw data (FRD), and outputs the generated force raw data (FRD) of the digital type to the touch processing circuit 75h.

The touch processing circuit 75h may be MCU (Micro Controller Unit), wherein the touch processing circuit 75h generates 3D touch information (TI) based on the touch raw data (TRD) and force raw data (FRD) supplied from the analog-to-digital converting circuit 75g, and outputs the generated 3D touch information (TI) to the host processing circuit 90. The touch processing circuit 75h according to one embodiment of the present invention calculates the touch position data based on the touch raw data (TRD) supplied from the analog-to-digital converting circuit 75g, temporarily stores the touch position data in the internal storing circuit, calculates the touch force data based on the force raw data (FRD) supplied from the analog-to-digital converting circuit 75g, temporarily stores the touch force data in the internal storing circuit, and then generates the 3D touch information (TI) based on the touch position data and the touch force data. In this instance, the touch processing circuit 75h calculates the touch position data and the touch force data through the execution of preset algorithm. This is the same as the description with reference to FIG. 2, whereby a repetitive description will be omitted.

The touch sensing circuit according to the second embodiment of the present invention may drive according to the first operation sequence of FIG. 3. The driving of the touch sensing circuit 70 according to the second embodiment of the present invention will be described with reference to FIGS. 3 and 5.

The touch sensing circuit 70 according to the second embodiment of the present invention executes the touch position sensing in the first period (P1) of the touch synchronization signal (Tsync), and executes the touch force sensing and the touch position calculation algorithm in the second period (P2) of the touch synchronization signal (Tsync) in parallel. This will be described in detail as follows.

First, during the first period (P1) of the touch synchronization signal (Tsync), the touch sensing circuit 70 according to the second embodiment of the present invention executes the touch position sensing in accordance with the sensing mode signal (SMS) of the first logic state. That is, the touch sensing circuit 70 according to the second embodiment of the present invention supplies the touch driving signal (TDS) to the first touch driving line (T_Tx) of the first touch panel 30 in accordance with the sensing mode signal (SMS) of the first logic state, generates the touch sensing signal (TSS) by sensing the change of capacitance in the first touch sensor through the first sensing unit 75e, generates the touch raw data (TRD) by converting the touch sensing signal (TSS) into the digital type through the analog-to-digital converting circuit 75g, and temporarily stores the generated touch raw data (TRD) in the touch processing circuit 75h.

Then, during the second period (P2) of the touch synchronization signal (Tsync), the touch sensing circuit 70 according to the second embodiment of the present invention executes the touch force sensing in accordance with the sensing mode signal (SMS) of the second logic state, and simultaneously generates the touch position data (Tdata) based on the touch raw data (TRD) through the execution of touch position calculation algorithm. That is, the touch sensing circuit 70 according to the second embodiment of the present invention supplies the touch driving signal (TDS) to the second touch driving line (F_Tx) of the second logic state in accordance with the sensing mode signal (SMS) of the second logic state, generates the force sensing signal (FSS) by sensing the change of resistance value in the second touch sensor through the second sensing unit 75f, generates the force raw data (FRD) by converting the force sensing signal (FSS) into the digital type through the analog-to-digital converting circuit 75g, and temporarily stores the force raw data (FRD) in the touch processing circuit 75h. At the same time, the touch sensing circuit 70 according to the second embodiment of the present invention calculates the touch position data (Tdata) based on the touch raw data (TRD) through the execution of touch position calculation algorithm of the touch processing circuit 75h.

Then, during the second period (P2) of the touch synchronization signal (Tsync), the touch sensing circuit 70 according to the second embodiment of the present invention calculates the touch force data (Fdata) based on the force raw data (FRD) through the execution of touch force calculation algorithm of the touch processing circuit 75h, generates the 3D touch information (TI) based on the touch position data (Tdata) and the touch force data (Fdata), and outputs the generated 3D touch information (TI) to the host processing circuit 90.

Accordingly, the touch sensing circuit 70 according to the another embodiment of the present invention executes the touch force sensing and the touch position calculation algorithm in parallel so that it is possible to execute the touch report rate at high speed, and also to improve sensitivity by minimizing a signal interference noise between the touch position sensing and the touch force sensing.

Alternatively, the touch sensing circuit 70 according to another embodiment of the present invention may be driven in the second operation sequence of FIG. 4. The driving of the touch sensing circuit 70 according to the second embodiment of the present invention will be described with reference to FIGS. 4 and 5.

First, during the first period (P1) of the touch synchronization signal (Tsync), the touch sensing circuit 70 according to the second embodiment of the present invention executes the touch position sensing every first sensing period (SP1) in accordance with the sensing mode signal (SMS) of the first logic state, and executes the touch force sensing every second sensing period (SP2) in accordance with the sensing mode signal (SMS) of the second logic state. That is, the touch sensing circuit 70 according to the second embodiment of the present invention supplies the touch driving signal (TDS) to the first touch driving lines (T_Tx) of the first logic state in accordance with the sensing mode signal (SMS) of the first logic state, generates the touch sensing signal (TSS) by sensing the change of capacitance in the first touch sensor through the first sensing unit 75e, generates the touch raw data (TRD) by converting the touch sensing signal (TSS) into the digital type through the analog-to-digital converting circuit 75g, and temporarily stores the touch raw data (TRD) in the touch processing circuit 75h. Also, the touch sensing circuit 70 according to the second embodiment of the present invention supplies the touch driving signal (TDS) to the second touch driving line (F_Tx) of the second touch panel 50 in accordance with the sensing mode signal (SMS) of the second logic state, generates the force sensing signal (FSS) by sensing the change of resistance value in the second touch sensor through the second sensing unit 75f, generates the force raw data (FRD) by converting the force sensing signal (FSS) into the digital type through the analog-to-digital converting circuit 75g, and temporarily stores the force raw data (FRD) in the touch processing circuit 75h.

Then, during the second period (P2) of the touch synchronization signal (Tsync), the touch sensing circuit 70 according to the second embodiment of the present invention simultaneously or sequentially calculates the touch position data (Tdata) based on the touch raw data (TRD) through the execution of touch position calculation algorithm in the touch processing circuit 75h, and the touch force data (Fdata) based on the force raw data (FRD) through the execution of touch force calculation algorithm in the touch processing circuit 75h, generates the 3D touch information (TI) based on the touch position data (Tdata) and the touch force data (Fdata), and outputs the 3D touch information to the host processing circuit 90.

Accordingly, the touch sensing circuit 70 according to the second embodiment of the present invention executes the touch force sensing for the blank period of the touch position sensing so that it is possible to execute the touch report rate at high speed, and to improve sensitivity by minimizing the signal interference noise between the touch position sensing and the touch force sensing. In addition, the touch sensing circuit 70 according to the second embodiment of the present invention is formed of one integrated circuit so that it is possible to reduce the number of elements provided in the touch screen apparatus.

Figure 6:
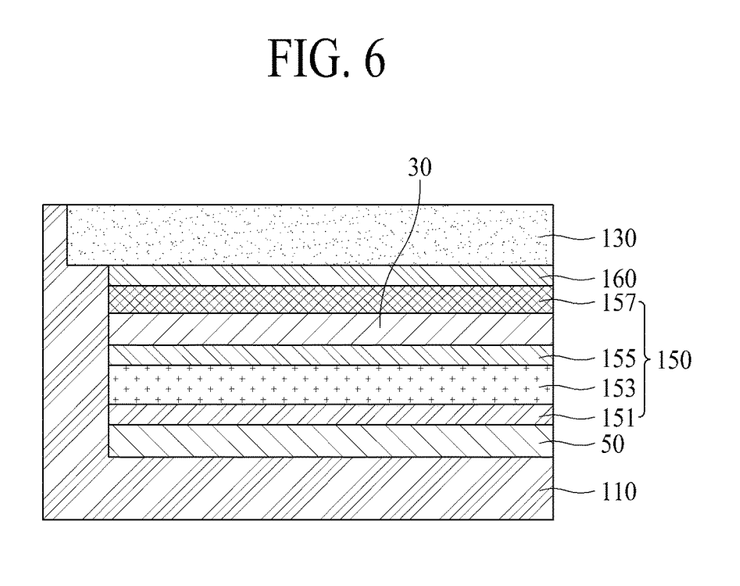
FIG. 6 illustrates an electronic device according to an embodiment of the present invention.

FIG. 6 illustrates an electronic device according to one embodiment of the present invention. Referring to FIG. 6, the electronic device according to one embodiment of the present invention may include a housing 110, a cover window 130, a display panel 150, a first touch panel 30, and a second touch panel 50.

The housing 110 has a space for receiving the display panel 150, the first touch panel 30, and the second touch panel 50 therein. That is, the housing 110 includes a bottom surface, and a sidewall being in perpendicular to the bottom surface, wherein the space may be prepared on the bottom surface surrounded by the sidewall.

Additionally, the housing 110 may further include a system arranging part. The system arranging part according to one embodiment of the present invention may be prepared at a rear surface of the housing 110, whereby a predetermined portion of the system arranging part may be in communication with the space of the housing 110, and the system arranging part may be opened and closed by a rear cover of the electronic device. The system arranging part according to another embodiment of the present invention may be prepared between a central frame disposed on the bottom surface of the housing 110 and the bottom surface of the housing 110.

The cover window 130 is provided at a sidewall of the housing 110 so as to cover the space of the housing 110. In this instance, a shock-absorbing member such as foam pad may be provided between the sidewall of the housing 110 and the cover window 130.

The display panel 150 may be a flexible organic light emitting display panel of displaying an image by the use of organic light emitting device. In this instance, the display panel 150 may have a flat-shaped type, a curved-shaped type, or a bending-shaped type. The display panel 150 according to one embodiment of the present invention may include a back plate 151, a pixel array substrate 153, and an encapsulation layer 155.

The back plate 151 is attached to a rear surface of the pixel array substrate 153 by the use of optical adhesive, to thereby maintain a flat state of the pixel array substrate 153.

The pixel array substrate 153 is prepared on the back plate 151. An image corresponding to a data signal supplied from a panel driving circuit is displayed on the pixel array substrate 153. The pixel array substrate 153 according to one embodiment of the present invention may include a base substrate, and a pixel array.

The base substrate is attached to an upper surface of the back plate 151 of a flexible material. For example, the base substrate may be PI (polyimide) film, but not limited to this type.

The pixel array may include a plurality of pixels provided every pixel region defined by crossing a plurality of gate lines and a plurality of data lines. Each pixel may include a switching transistor connected with the gate line and the data line, a driving transistor supplied with the data signal from the switching transistor, and an organic light emitting device for emitting light by a data current supplied from the driving transistor. The organic light emitting device may include an anode electrode connected with the driving transistor, an organic emitting layer prepared on the anode electrode, and a cathode electrode prepared on the organic emitting layer. Each pixel is defined by a bank pattern.

A pad area, which is connected with each signal line prepared in the pixel array, is prepared at one side of the base substrate. The pad area is connected with the panel driving circuit.

The encapsulation layer 155 is prepared on an entire upper surface of the base substrate so as to cover the pixel array. The encapsulation layer 155 protects the organic light emitting device from oxygen or moisture.

The first touch panel 30 is disposed on the display panel 150, wherein the first touch panel 30 senses a user's touch position. The first touch panel 30 includes a plurality of first touch sensors, wherein a capacitance in each of the first touch sensors is changed by a user's touch. The first touch panel 30 is the same as the first touch panel described with reference to FIG. 1, whereby the same reference number will be used, and a repetitive explanation for the first touch panel 30 will be omitted.

The first touch panel 30 according to one embodiment of the present invention may be attached to the encapsulation layer 155 of the display panel 150. In this instance, the display panel 150 may further include a polarizing film 157 attached to the first touch panel 30. The polarizing film 157 improves visibility of the display panel 150 by preventing a reflection of external light.

The polarizing film 157 may be attached to a lower surface of the cover window 130 by the use of transparent adhesive member 160. In this instance, the transparent adhesive member 160 may be OCA (optical clear adhesive) or OCR (optical clear resin).

The second touch panel 50 is disposed below the display panel 150, wherein the second touch panel 30 senses a user's touch force. The second touch panel 50 includes a plurality of second touch sensors, wherein a resistance value in each of the second touch sensors is changed by a user's touch. For example, the second touch panel 50 may be disposed between the bottom surface of the housing 110 and the display panel 150. In this instance, the second touch panel 50 transmits heat of the display panel 150 to the housing 110 by heat radiation method or heat transmission method, to thereby emit the heat.

Figure 7:
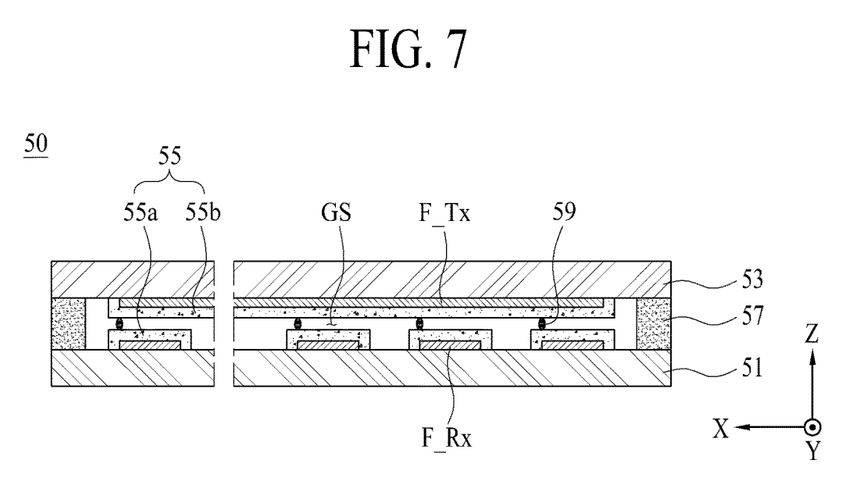
FIG. 7 is a cross sectional view illustrating a structure of a second touch panel shown in FIG. 6.

As shown in FIG. 7, the second touch panel 50 according to one embodiment of the present invention may include a first substrate 51, a second substrate 53, a resistor member 55, and a substrate attachment member 57.

The first substrate 51 may be formed of a transparent plastic material, for example, PET (polyethyleneterephthalate) material. The first substrate 51 may include second touch sensing lines (F_Rx). Each of the second touch sensing lines (F_Rx) may be formed in a bar shape, wherein each of the second touch sensing lines (F_Rx) is parallel to a first direction (X) of the first substrate 51, and the second touch sensing lines (F_Rx) are provided at fixed intervals along a second direction (Y) being in perpendicular to the first direction (X). Each of the second touch sensing lines (F_Rx) is connected with the touch sensing circuit, whereby each of the second touch sensing lines (F_Rx) functions as a sensing electrode for sensing a force touch.

In the same manner as the first substrate 51, the second substrate 53 is formed of a transparent plastic material, for example, PET material. The second substrate 53 may include a plurality of second touch driving lines (F_Tx). Each of the plurality of second touch driving lines (F_Tx) is prepared on a lower surface of the second substrate 53, and each of the plurality of second touch driving lines (F_Tx) is perpendicular to each of the plurality of second touch sensing lines (F_Rx). The plurality of second touch driving lines (F_Tx) may be formed of a transparent conductive material. Each of the plurality of second touch driving lines (F_Tx) may be formed in a bar shape, wherein each of the second touch driving lines (F_Tx) is parallel to the second direction (Y) of the first substrate 51, and the plurality of second touch driving line (F_Tx) are provided at fixed intervals along the first direction (X). Each of the plurality of second touch driving lines (F_Tx) is connected with the touch sensing circuit, whereby each of the second touch driving lines (F_Tx) functions as a driving electrode for sensing a force touch.

The resistor member 55 is prepared at the crossing portion between the second touch driving line (F_Tx) and the second touch sensing line (F_Rx). The resistor member 55 forms the second touch sensor (Rm), that is, a resistance in the crossing portion between the second touch driving line (F_Tx) and the second touch sensing line (F_Rx). A resistance value in the second touch sensor (Rm) is changed based on a contact area between the resistor member 55 and the second touch driving line (F_Tx) in accordance with a user's force touch (or contact load) for the second substrate 53, to thereby sense a user's force touch.

The resistor member 55 according to the first example of the present invention may be prepared on an upper surface of the first substrate 51 so as to cover the plurality of second touch sensing lines (F_Rx). The resistor member 55 according to the second example of the present invention may be prepared on a rear surface of the second substrate 53 confronting the first substrate 51 so as to cover the plurality of second touch driving lines (F_Tx). The resistor member 55 according to the first and second examples of the present invention is formed as one body, which is suitable for sensing a single force touch.

The resistor member 55 according to the third example of the present invention may include a plurality of first elastic resistor patterns 55a, and a plurality of second elastic resistor patterns 55b. The plurality of first elastic resistor patterns 55a may be prepared in an upper surface of the first substrate 51, wherein the plurality of first elastic resistor patterns 55a may cover the plurality of second touch sensing lines (F_Rx) in a one-to-one correspondence. That is, one of the first elastic resistor patterns 55a is patterned in the upper surface of the first substrate 51 so as to cover one of the second touch sensing line (F_Rx). The plurality of second elastic resistor patterns 55b may be prepared in a lower surface of the second substrate 53 confronting the upper surface of the first substrate 51, wherein the plurality of second elastic resistor patterns 55b may cover the plurality of second touch driving lines (F_Tx) in an one-to-one correspondence. That is, one of the second elastic resistor pattern 55b is patterned in the lower surface of the second substrate 53 so as to cover one of the second touch driving line (F_Tx).

In case of the elastic resistor member 55 according to the third example of the present invention, the plurality of first elastic resistor patterns 55a are separated from one another, and the plurality of second elastic resistor patterns 55b are separated from one another, which is appropriate for sensing a multi-force touch. The resistor member 55 according to one embodiment of the present invention may be formed of a piezo-resistive based material or a pressure-sensitive adhesive material based on any one of QTC (quantum tunneling composites), EAP (electro-active polymer) and acrylic and rubber based solvent. In this instance, a resistance of the pressure-sensitive adhesive material is changed according to an area. In case of the piezo-resistive based material, if an external pressure is applied to silicon semiconductor crystals, a conduction energy is generated, and an electric charge is transferred to a conduction band, whereby it is possible to have a piezo-resistive effect by a change of resistivity. The change of resistivity is largely changed according to a size of the pressure. The resistor member 55 may be coated onto the first and/or second substrate 51 and/or 53 by a printing process, or may be attached to the first and/or second substrate 51 and/or 53 by an attaching process using an adhesive.

By the substrate attachment member 57, a gap space (GS, or vertical gap) is prepared between the first and second substrates 51 and 53, and the first and second substrates 51 and 53 confronting each other are bonded to each other. The substrate attachment member 57 may be an adhesive of a cushion material. The substrate attachment member 57 structurally functions as a supporter for supporting the first and second substrates 51 and 53 with the gap space (GS) provided in-between.

Additionally, the second touch panel 50 may further include a spacer 59. The spacer 59 is interposed between the second touch driving line (F_Tx) and the second touch sensing line (F_Rx) confronting each other. The spacer 59 maintains the gap space (GS) between the first and second substrates 51 and 53, or restores the first substrate 53 being pressed or bent by a user's force touch to its original position.

Figure 8:
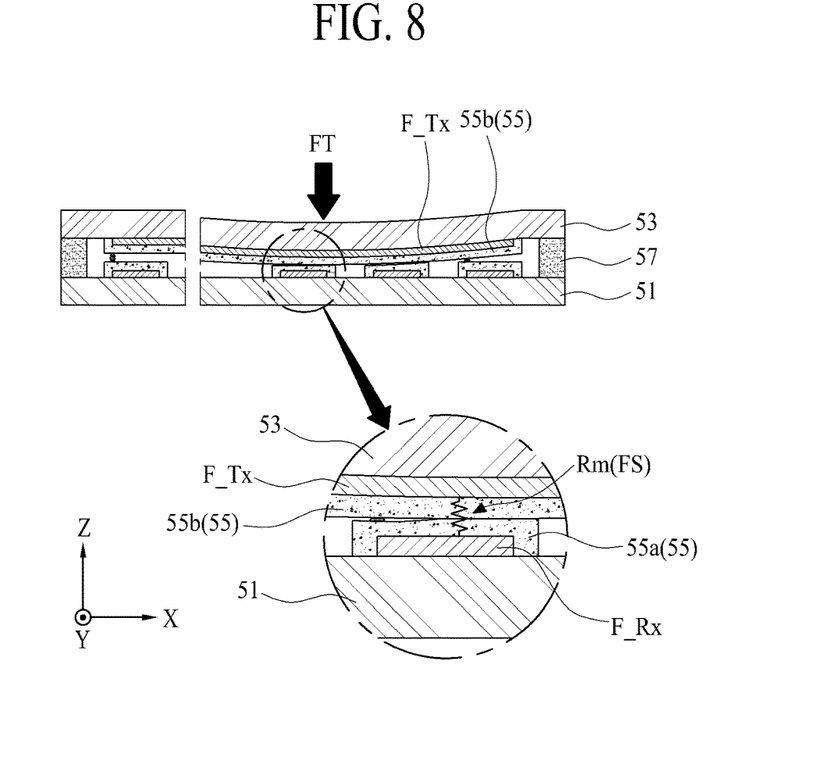
FIG. 8 is a cross sectional view illustrating a fabricating process of a second touch sensor in the second touch panel shown in FIG. 7.

As shown in FIG. 8, in case of the second touch panel 50 according to one embodiment of the present invention, if the second elastic resistor pattern 55b is in a physical contact with the first elastic resistor pattern 55a in accordance with the force touch (FT) applied by a user's touch, the resistor member 55, that is, resistance of the second touch sensor (Rm) is formed between the second touch driving line (F_Tx) and the second touch sensing line (F_Rx) crossing each other, whereby a current in accordance with the touch driving signal supplied to the second touch driving line (F_Tx) through the resistance flows in the second touch sensing line (F_Rx). Accordingly, the touch sensing circuit generates force raw data by amplifying a voltage corresponding to the current flowing in the second touch sensor (Rm), and generates touch force data based on the force raw data.

In addition, the second touch panel 50 according to another embodiment of the present invention may include a first substrate, a plurality of second touch driving lines provided at fixed intervals on the first substrate, a plurality of second touch sensing lines provided adjacent to the plurality of second touch driving lines in parallel and disposed on the first substrate, a second substrate covering the first substrate, a resistor member provided on a lower surface of the second substrate while being confronted with the first substrate, and a substrate attachment member for providing a gap space (or vertical gap) between the first and second substrates and attaching the first and second substrates to each other. Except that the second touch driving line and the second touch sensing line are provided in parallel without being in perpendicular to each other on the first substrate, the second touch panel 50 according to another embodiment of the present invention is the same as the second touch panel 50 shown in FIG. 7, whereby a detailed description for the second substrate 50 will be omitted.

Additionally, the electronic device according to one embodiment of the present invention may further include a system driving circuit, wherein the system driving circuit may be received in the system arranging part prepared in the housing 110. The system driving circuit according to one embodiment of the present invention may include a panel driving circuit, a touch sensing circuit, and a host processing circuit.

The panel driving circuit is connected with the display panel 150, whereby an image is displayed on the display panel 150. The touch sensing circuit generates 3D touch information by sensing the touch position through the first touch panel 30 and sensing the touch force through the second touch panel 50 in accordance with a preset operation sequence. The touch sensing circuit is the same as the touch sensing circuit 70 described with reference to FIGS. 1 to 5, whereby a detailed description for the touch sensing circuit will be omitted. The host processing circuit executes an application corresponding to the 3D touch information supplied from the touch sensing circuit.

Figure 9:
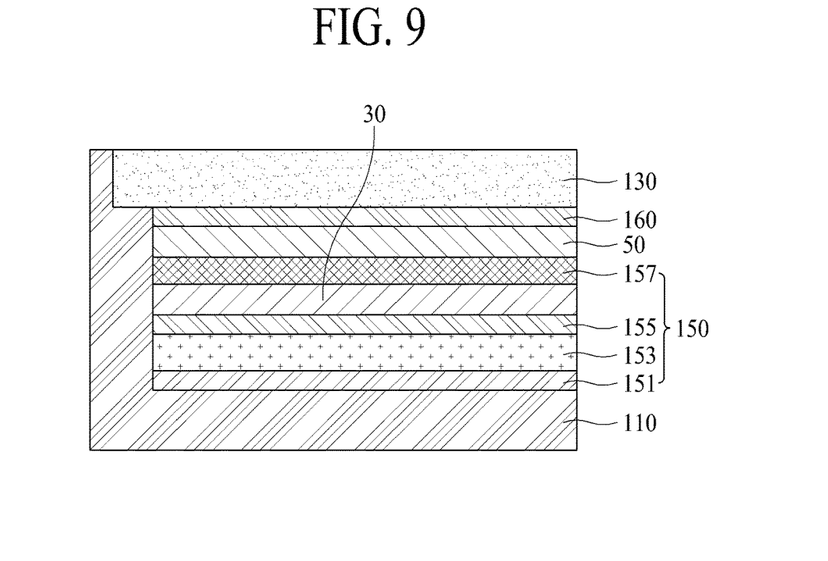
FIG. 9 illustrates an electronic device according to an embodiment of the present invention.

FIG. 9 illustrates an electronic device according to another embodiment of the present invention. The electronic device according to another embodiment of the present invention is obtained by changing an arrangement structure of a second touch panel of the electronic device according to one embodiment of the present invention. Hereinafter, only arrangement structure of the second touch panel will be described in detail.

First, the electronic device according to another embodiment of the present invention may include a housing 110, a cover window 130, a display panel 150, a first touch panel 30, and a second touch panel 50. These elements are the same as those of FIG. 6, whereby a detailed description for each element will be omitted.

The second touch panel 50 is disposed below the cover window 130. That is, the second touch panel 50 is disposed between the cover window 130 and the display pane 150, whereby the second touch panel 50 is relatively close to a user's touch portion in comparison to the first touch panel 30. Accordingly, the second touch sensor prepared in the second touch panel 50 easily reacts to a user's touch, to thereby improve sensitivity in force touch sensing.

The second touch panel 50 may be attached to a lower surface of the cover window 160 by the use of transparent adhesive member 160. Alternatively, the second touch panel 50 may be provided inside the display panel 150. For example, the second touch panel 50 may be disposed between a polarizing film 157 and the first touch panel 30. In this instance, the first touch panel 30 is attached to an encapsulation layer 155 of the display panel 150, the second touch panel 50 is attached to the first touch panel 30, and the polarizing film 157 is attached to the second touch panel 50. Accordingly, the display panel 150, the first touch panel 30, and the second touch panel 50 are physically connected with one another, to thereby form one module.

The electronic device according to the embodiment of the present invention includes the touch screen apparatus according to the embodiment of the present invention, whereby it is possible to realize the electronic device with the flat-shaped type, curved-shaped type, or bending-shaped type, and to improve sensitivity in touch force sensing.

Additionally, in case of FIGS. 6 and 7, the display panel 150 of the electronic device is the organic light emitting display panel, but not limited to this type. For example, the display panel according to the embodiment of the present invention may be a liquid crystal display panel. In this instance, if applying the liquid crystal display panel, the electronic device according to the embodiment of the present invention may further include a backlight unit for emitting light to the liquid crystal display panel, wherein the backlight unit is received in the space of the housing 110.

As described above, the electronic device according to the embodiment of the present invention may be any one among electronic notebook, electronic book (e-book), PMP (Portable Multimedia Player), navigation, UMPC (Ultra Mobile PC), mobile phone, smart phone, smart watch, tablet PC (tablet Personal Computer), watch phone, wearable device, mobile communication terminal, television, notebook computer, and monitor.

According to the present invention, it is possible to execute the touch report rate at high speed, and to minimize the signal interference noise between the touch position sensing and the touch force sensing, to thereby improve sensitivity. Also, it is possible to provide the touch screen apparatus which is applicable to the flat, curved or bending shaped display device.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A touch screen apparatus comprising:
   a first touch panel having a first touch sensor whose capacitance is changed by a user touch input;
   a second touch panel having a second touch sensor whose resistance is changed by the user touch input; and
   a touch sensing circuit configured to generate and output three-dimensional (3D) touch information by sensing a touch position through the first touch sensor and sensing a touch force through the second touch sensor based on of a touch synchronization signal,
   wherein the first and second touch panels are separated from each other and disposed at different layers,
   wherein the touch synchronization signal has first and second periods,
   wherein the touch sensing circuit is further configured to:
      during the first period, generate touch raw data corresponding to the user touch input by sensing a change of capacitance in the first touch sensor, and
      during the second period, generate force raw data corresponding to the user touch input by sensing a change of resistance in the second touch sensor, calculate a touch position including coordinates of the user touch input based on the touch raw data, and generate and output the 3D touch information based on the touch position and the force raw data, and
   wherein the touch sensing circuit generates the force raw data by sensing the change of resistance in the second touch sensor and simultaneously calculates touch position data from the touch raw data.

2. The touch screen apparatus according to claim 1, wherein the touch sensing circuit calculates touch force data from the force raw data, and generates and outputs the 3D touch information based on the touch position data and the touch force data.

3. The touch screen apparatus according to claim 1, wherein the touch sensing circuit includes:
- a first touch integrated circuit for generating the touch raw data by sensing the change of capacitance in the first touch sensor and calculating touch position data from the touch raw data; and
- a second touch integrated circuit for generating the force raw data by sensing the change of resistance in the second touch sensor and calculating touch force data from the force raw data,
- wherein the first touch integrated circuit or second touch integrated circuit generates and outputs the 3D touch information based on the touch position data and the touch force data.

4. The touch screen apparatus according to claim 3, wherein the first touch integrated circuit generates a force touch synchronization signal based on the touch synchronization signal, and generates and outputs the 3D touch information based on the touch position data and the touch force data, and
- wherein the second touch integrated circuit calculates the touch force data based on the force raw data according to the force touch synchronization signal and provides the touch force data to the first touch integrated circuit.

5. The touch screen apparatus according to claim 1, wherein the second touch panel includes:
- a first substrate having a touch sensing line;
- a second substrate having a touch driving line being in perpendicular to the touch sensing line; and
- a resistor member prepared between the touch driving line and the touch sensing line,
- wherein the second touch sensor is provided at an intersection of the touch driving line and the touch sensing line.

6. The touch screen apparatus according to claim 1, wherein the second touch panel includes:
- a first substrate having a touch driving line and a touch sensing line being in parallel;
- a second substrate for covering the first substrate;
- a resistor member prepared on a lower surface of the second substrate while being confronted with the first substrate; and
- a substrate attachment member for preparing a gap between the first substrate and the second substrate,
- wherein the second touch sensor is provided between the touch sensing line and the touch driving line being in contact with the resistor member.

7. An electronic device comprising:
- a display panel for displaying an image; and
- the touch screen apparatus according to claim 1,
- wherein each of the first and second touch panels of the touch screen apparatus is overlapped with the display panel.

8. The electronic device according to claim 7, further comprising:
- a housing with a space for receiving the display panel and the first and second touch panels therein; and
- a cover window for covering the space of the housing,
- wherein the second touch panel is disposed below the display panel or the cover window.

9. The electronic device according to claim 7, wherein the touch sensing circuit of the touch screen apparatus includes:
- a first touch integrated circuit for generating touch raw data by sensing the change of capacitance in the first touch sensor and calculating touch position data from the touch raw data; and
- a second touch integrated circuit for generating force raw data by sensing the change of resistance in the second touch sensor and calculating touch force data from the force raw data,
- wherein the first touch integrated circuit or second touch integrated circuit generates and outputs 3D touch information based on the touch position data and the touch force data.

10. The electronic device according to claim 9, wherein the first touch integrated circuit generates a force touch synchronization signal based on a touch synchronization signal, generates the 3D touch information based on the touch position data and the touch force data, and outputs the 3D touch information to a host processing circuit, and
- wherein the second touch integrated circuit calculates the touch force data based the force raw data according to on the force touch synchronization signal, and provides the touch force data to the first integrated circuit.

11. The electronic device according to claim 7, wherein the second touch panel includes:
- a first substrate having a touch sensing line;
- a second substrate having a touch driving line being in perpendicular to the touch sensing line; and
- a resistor member prepared between the touch driving line and the touch sensing line,
- wherein the second touch sensor is provided at an intersection between the touch driving line and the touch sensing line.

12. The electronic device according to claim 7, wherein the second touch panel includes:
- a first substrate having a touch driving line and a touch sensing line being in parallel;
- a second substrate for covering the first substrate;
- a resistor member prepared on a lower surface of the second substrate while being confronted with the first substrate; and
- a substrate attachment member for preparing a gap between the first substrate and the second substrate,
- wherein the second touch sensor is provided between the touch sensing line and the touch driving line being in contact with the resistor member.

13. The touch screen apparatus according to claim 1, wherein the touch sensing circuit includes:
- a selector;
- a first sensing unit that generates a touch sensing signal in accordance with the change of capacitance in the first touch sensor;
- a second sensing unit that generates a force sensing signal in accordance with the change of resistance in the second touch sensor; and
- a touch processing circuit,
- wherein the selector selects the first sensing unit or the second sensing unit, and
- wherein the touch processing circuit generates the 3D touch information based on the touch sensing signal and the force sensing signal.

14. The touch screen apparatus according to claim 13, wherein the touch sensing circuit further includes a second selector that selectively supplies a touch driving signal to the first touch panel or the second touch panel.

15. The touch screen apparatus according to claim 13, wherein the touch synchronization signal has first and second periods, and
- wherein the first sensing unit generates a touch sensing signal by sensing the change of capacitance in the first touch sensor for the first period, the second sensing unit generates the force sensing signal by sensing the change of resistance in the second touch sensor for the second period, and the touch processing circuit generates and outputs the 3D touch information based on the touch sensing signal and the force sensing signal.

16. The touch screen apparatus according to claim 15, wherein the second sensing unit generates the force sensing signal by sensing the change of resistance in the second touch sensor and simultaneously, the touch processing circuit calculates touch position data from the touch sensing signal, calculates touch force data from the force sensing signal, and generates and outputs the 3D touch information based on the touch position data and the touch force data.

17. The touch screen apparatus according to claim 1, wherein generation of the touch raw data in the first period is completed before a start of generation of the force raw data in the second period, and generation of the force raw data and calculation of the touch position are performed in parallel during the second period.

18. A touch screen apparatus comprising:
a first touch panel having a first touch sensor whose capacitance is changed by a user touch input;
a second touch panel having a second touch sensor whose resistance is changed by the user touch input; and
a touch sensing circuit configured to generate and output three-dimensional (3D) touch information by sensing a touch position through the first touch sensor and sensing a touch force through the second touch sensor on the basis of a touch synchronization signal,
wherein the first and second touch panels are separated from each other and disposed at different layers,
wherein the touch synchronization signal has first and second periods,
wherein the first period of the touch synchronization signal includes at least one first sensing period and at least one second sensing period different from the at least one first sensing period, and
wherein the touch sensing circuit is further configured to:
during the at least one first sensing period in the first period, generate touch raw data corresponding to the user touch input by sensing a change of capacitance in the first touch sensor,
during the at least one second sensing period in the first period, generate force raw data corresponding to the user touch input by sensing a change of resistance in the second touch sensor, and
during the second period, generate and output the 3D touch information based on the touch position and the force raw data,
wherein the touch sensing circuit generates the force raw data by sensing the change of resistance in the second touch sensor and simultaneously calculates touch position data from the touch raw data during the at least one second sensing period.

19. The touch screen apparatus according to claim 18, wherein the touch sensing circuit includes:
a selector;
a first sensing unit that generates a touch sensing signal in accordance with the change of capacitance in the first touch sensor;
a second sensing unit that generates a force sensing signal in accordance with the change of resistance in the second touch sensor; and
a touch processing circuit,
wherein the selector selects the first sensing unit or the second sensing unit, and
wherein the touch processing circuit generates the 3D touch information based on the touch sensing signal and the force sensing signal.

20. An electronic device comprising:
a display panel for displaying an image; and
the touch screen apparatus according to claim 18,
wherein each of the first and second touch panels of the touch screen apparatus is overlapped with the display panel.

* * * * *